United States Patent Office 3,405,057
Patented Oct. 8, 1968

3,405,057
METHOD FOR IMPROVING MOLECULAR SIEVES
Richard W. Neuzil, Downers Grove, and Hertha Skala, Lake Zurich, Ill., assignors to Universal Oil Products Company, Des Plaines, Ill., a corporation of Delaware
No Drawing. Filed Jan. 28, 1966, Ser. No. 523,520
4 Claims. (Cl. 208—310)

ABSTRACT OF THE DISCLOSURE

Separation of straight chain hydrocarbons from hydrocarbon mixtures by means of bindered zeolite particles which have been preliminarily treated with liquid water at below about 175° C., followed by drying of the particles to remove the water, whereby to improve the sorption exchange rate of the zeolite particles and desensitize the latter to surface poisons.

---

This invention relates to a method to improve the sorption characteristics of zeolite particles. More specifically, this invention relates to increasing the sorption exchange rate of molecular sieves and densensitizing the sieves to surface poisons which act to decrease the exchange rate. Still more specifically, this invention relates to the treating of molecular sieves to improve their sorption characteristics in processes for the separation of straight chain hydrocarbons from hydrocarbon mixtures containing their branched chain isomers and cyclic analogs.

In one of its embodiments, this invention relates to a method for improving the sorption characteristics of bindered zeolite particles which comprises: contacting the molceular sieves with water at a temperature below about 175° C.; and drying the contacted molecular sieves.

Several sorption-type processes utilizing specific sorbents are known for the separation of compounds on the basis of their molecular structure and/or chemical composition utilizing an inorganic sorbent containing pores in which one or more of the components of the mixture belonging to a particular class of materials is selectively sorbed and retained in the pores of the sorbent but in which one or more components belonging to another class of substances are rejected by the sorbent. An example of this is employing zeolite-type sorbents comprising crystalline aluminosilicates, particularly the dehydrated zeolitic alkali metal and alkaline earth metal crystalline aluminosilicate which upon dehydration contain pore entrances of less than about 6 angstrom units in cross-sectional diameter and which have a high sorbent capacity for straight chain hydrocarbons but which reject branched chain and cyclic hydrocarbons because the cross-sectional diameters of the pore entrances do not permit entry of hydrocarbons having larger molecular diameters than straight chain hydrocarbons. A specific sorbent is the calcium form of Type A aluminosilicate described in U.S. Patent No. 2,882,243. This calcium aluminosilicate has port entrance diameters of about 5 angstrom units which permits straight chain hydrocarbons such as normal paraffins and normal olefins to pass through the pore entrance but which prevents non-straight chain hydrocarbons such as branched chain paraffins, napthenes and aromatics from passing through the pore entrance because of the larger molecular cross-sectional diameter of these latter hydrocarbons. Processes have been devised to achieve this separation using molecular sieves in an efficient and continuous manner. Such a process is shown and claimed in U.S. Patent No. 2,985,589. In said patented process, a straight chain hydrocarbon having a different boiling point is employed as desorbent to displace the sorbed straight chain hydrocarbon of the feed. An important consideration in said process is that the rate of exchange of straight chain desorbent hydrocarbon for straight chain feed hydrocarbon and vice versa be high enough and remain relatively constant over a long period of time to attain an economical and efficient separation. It has also been found that some molecular sieves adsorb certain polar molecules such as polycyclic aromatics, sulfur, nitrogen and oxygen containing organic compounds, etc. These polar molecules appear to be adsorbed on the surface of the molecular sieve and cause the above referred to rates of exchange to decrease.

The pore structure of the molecular sieves used in these processes is a series of interlaced cavities connected by still smaller pore entrances. The pore entrances are of uniform size and are responsible for the separation on the basis of molecular size. The molecular sieves are generally prepared by crystallizing the solid aluminosilicate from aqueous solutions. Generally, these solid crystals are of very small size, in the order of 5 microns, and as such are not useful in commercial operation. The solid crystals are aggregated into larger and more useful particles by the addition of a suitable binder such as clay. These binders are added in concentrations as high as 20 wt. percent of the finished particle. These finished particles, called fresh molecular sieves, are loaded into a suitable contacting chamber and subsequently used to separate straight chain hydrocarbon from petroleum fractions. When the petroleum fraction is passed over the bed of fresh molecular sieves, the polar contaminants in the petroleum fraction can cause the fresh sieve to deactivate (cause the rates of exchange to decrease) eventually resulting in impractical separation. This in turn causes the process to be shut down until the sieves can be regenerated. It has been found that the method of this invention enhances the rates of exchange even above that of fresh molecular sieves while simultaneously and additionally desensitizing the bindered molecular sieves to the effect of said polar contaminants.

It is an object of this invention to increase the exchange rate of fresh bindered zeolite particles.

It is another object of this invention to desensitize zeolite particles to the effect of surface poisons.

It is still another object of this invention to improve the sorption characteristics of molecular sieves employed in processes for the separation of straight chain hydrocarbons from hydrocarbon mixtures and thereby make said process more efficient.

These and other objects will become more apparent in the light of the following detailed description.

We have found that by contacting fresh bindered molecular sieves with liquid water at temperatures below 175° C. before using the sieves to separate straight chain hydrocarbons, the sorption characteristics of said sieves are greatly improved. When these treated sieves are subsequently employed in a separation process, improved results (either higher yield of straight chain hydrocarbons or higher purity of straight chain hydrocarbons or both) are obtained. In a typical separation process, the molecular sieve sorbent is loaded into a fixed bed and the feed stock containing the straight chain components is introduced at some point into the bed. The process may contain two chambers, each containing a fixed bed of sorbent, one bed on a sorption cycle and the other bed on a desorption cycle and at some point later in time, switching the beds. This is the well-known swing bed process. Another process continuously operated employs a single contacting chamber but maintains different zones within the chamber and continuously shifts the zones by moving the points at which feed stock and desorbent are introduced and raffinate and sorbate are withdrawn. This is the simulated counter-current contacting process described and claimed in U.S. Patent No. 2,985,589. Usually, in each of these processes, the selectively sorbed straight chain hydrocarbon is displaced from the sieve by a desorbent straight chain hydrocarbon preferably of a sufficiently different molecular weight to render the desorbent readily separable from the feed stock components by ordinary fractionation. A raffinate and a sorbate stream are produced from the process and said streams are separately fractionated and the desorbent from each stream is combined and returned to the desorption zone. It has been found that after repeated charging of feed stock over the sieves, said sieves deactivate, that is the exchange rate for displacement of feed straight chain hydrocarbons with desorbent straight chain hydrocarbons decreases or becomes slower. It is thought that at least in part this deactivation is caused by surface poisons such as those polar contaminants described hereinbefore. The process continues to become more inefficient with the passage of feed stock over the sieves until it becomes uneconomical to continue the operation and the process must accordingly be shut down and the sieves must be regenerated. We have unexpectedly found that if the sieves are contacted with liquid water at temperatures below 175° C. prior to being contacted with feed stock the sieves are desensitized to the effect of the foregoing described surface poisons. It has also been unexpectedly discovered that this water contacting step actually increases said exchange rate over that of fresh unused sieves. Thus, the water contacting step improves the performance of the process and permits the process to be run for longer periods of time between regenerations.

It is preferable that the water be maintained in the liquid phase when contacting the bindered molecular sieves. Thus, it is to be understood that if temperatures in excess of 100° C. are employed, superatmospheric pressures sufficient to maintain the water in the liquid phase will also be employed. When water is introduced into the bed of fresh sieves that water will be sorbed with a resulting evolution of heat due to the heat of adsorption. Accordingly, to limit the maximum temperature attained in the bed, the temperature of the inlet water and the rate are controlled so that the bed is held below 175° C. As the water passes through the bed, a temperature gradient due to the initial heat of adsorption will also pass through the bed. When the temperature gradient has passed through the bed, the temperature of the inlet water is increased to maintain the temperature within the bed of from 25° C. to about 175° C. and preferably within the range of from 60° C. to 150° C. Sufficient water may be continually passed through the bed to maintain the desired temperature or hot water may be introduced and the water maintained in contact with the sieves until the bed has cooled off. A diluent such as a hydrocarbon may also be added along with the water to reduce the extreme temperatures due to the initial heat of adsorption. For example, a two phase mixture of liquid water and liquid hydrocarbon or alternately and more preferably, a hydrocarbon liquid containing dissolved water is initially introduced into the bed of fresh sieves. This may or may not be followed by a contacting step with substantially pure water. Another preferable method comprises vapor phase wetting followed by liquid phase washing with water as herein described. The water may be continually passed through the bed (with or without recycle of the water) or may be left in contact with no circulation. The time for contact is suitably from about a few minutes up to about 24 hours. Longer times are also satisfactory although little is gained from excess exposure. Preferably, times of from about 2 hours up to 24 hours are employed depending upon temperature. Generally, the higher the temperature, the shorter is the preferable contact time.

After the water contacting step has been completed, the sieves should be carefully dried before the sieve bed is raised to process temperatures to avoid hydrothermal damage to the pore structure. Generally, if these bindered sieves are exposed to liquid water at temperatures above 175° C. the water tends to attack the aluminum and silicon centered tetrahedral structure causing collapse and rendering the sieves either incapable of attaining the high normal hydrocarbon exchange rate or severely reducing the capacity of the sieves to sorb straight chain hydrocarbons. Preferably the liquid water is displaced by a hydrocarbon fluid before raising temperatures above 175° C. and then the temperatures of the sieve bed are slowly raised to dry out the interior structure of the sieves. Suitable hydrocarbon fluids both for drying and for acting as diluents comprise any convenient hydrocarbon and preferably light hydrocarbons such as pentane, hexane, heptane, cyclohexane, methyl cyclopentane, benzene, mixtures thereof, etc. The drying operation is preferably carried out in the vapor phase where ultimately temperatures as high as from about 200° C. to about 375° C. are attained depending on the desired residual water content of the sieves. The sieves are thereupon ready for processing hydrocarbon charge stocks to separate high purity normal hydrocarbons.

It is thought that when the small crystal particles are aggregated into useful particle sizes the binder tends to clog some of the pore openings as well as to attract surface poisons. Although it is not understood exactly how the water improves the sorption characteristics of molecular sieves, it is postulated that the water tends to act on the binder and reduce the undesirable effects of the binder.

The method of this invention is suitable for any bindered molecular sieves although its effect is most easily seen on those molecular sieves having pore entrance diameters less than 6 angstroms. Examples of suitable bindered molecular sieves to be treated by the method of this invention comprises chabazite, Type A (both sodium and calcium forms), faujasite, mordenite, etc.

The following examples are presented to further illustrate the method of this invention but it is not intended to limit the invention to the operating conditions nor the materials disclosed therein.

Example I

Commercially available clay bindered (about 20% by weight) molecular sieves having an X-ray diffraction pattern similar to those compositions shown in U.S. Patent No. 2,882,243 (Type A) are obtained and dried to a water content of 1.8 wt. percent in nitrogen. A portion of these are evaluated for normal paraffin exchange in a dynamic test apparatus in the following manner. A first mixture of 16% n-tetradecane in isooctane is introduced into one end of a fixed bed thereby contacting a 40 cc. bed of these fresh molecular sieves at 300 p.s.i.g., 232° C. and 3 liquid hourly spaced velocity (LHSV). When the molecular sieve cavities are full of n-tetradecane as evidenced by a GLC analysis of the effluent from the other end of the fixed bed, a desorbent second mixture containing 16% chemically pure n-decane in chemically pure isooctane is introduced into one end of a fixed bed at the above conditions to effect the displacement of n-tetradecane within the sieve cavities by n-decane. This is continued until the effluent contains no n-tetradecane by GLC analysis. The first mixture is thereupon reintroduced into said one end again until the effluent contains no n-decane. The steepness of the concentration gradient for the appearance of n-tetradecane in the effluent is observed and taken as a measure of the rate of sorption of n-tetradecane. Specifically, during the latter $nC_{14}$ displacing of $nC_{10}$ it was found that 13.0 cc. of first mixture is required to be introduced into said one end in order for the concentration of $nC_{14}$ in the effluent to go from 1.6% to 14.4% (these concentrations being the 10% point and the 90% point of the concentrations of $nC_{14}$ in the first mixture). This volume of first mixture required to change the effluent from 10% to 90% of $nC_{14}$ can be taken as a measure of the rate of sorption of $nC_{14}$ and the higher said volume the slower the rate of sorption. This volume of first mixture is hereinafter referred to as the breakthrough slope.

Example II

A second batch of the fresh sieves of Example I are washed in liquid water at 100° C. for a period of 4 hours and dried carefully to a water content of 1.8 wt. percent in nitrogen. These water washed sieves are evaluated in the dynamic test apparatus described in Example I and resulted in a breakthrough slope of 11.2 cc. Thus, it is seen that the water washing step has increased the rate of exchange of $C_{14}$ for $C_{10}$ by 13.8% for fresh unused sieves.

Example III

The sieves used in Example I are evaluated in the dynamic test apparatus described in Example I except for one change, namely, the presence of 4% naphthalene in the first and second mixtures with the isooctane concentration being reduced by the 4%. Naphthalene tends to act as a surface poison and after evaluating the sieves, the breakthrough slope is found to be 24.0 cc. Thus, the presence of 4% naphthalene in the mixtures has caused the rate of exchange of $C_{14}$ for $C_{10}$ to decrease by 84.6% for the unwashed sieves.

Example IV

Another portion of the sieves of Example II are evaluated in the dynamic test apparatus described in Example I using the mixtures described in Example III. The breakthrough slope is found to be 12.2 cc. Thus, the presence of 4% naphthalene in the mixtures has caused the rate of exchange of $C_{14}$ for $C_{10}$ to decrease by only 8.9% for the water washed sieves. Comparing the results of Example III and Example IV clearly shows the desentizing effect on surface poisons by water washing the sieves.

Example V

Another batch of commercially available clay bindered Type A molecular sieves are evaluated in the dynamic test apparatus in the same manner as described in Example I resulting in an initial breakthrough slope of 14 cc. These sieves are then exposed to successive exchanges of $C_{10}$ and $C_{14}$ with said first and second mixtures to both of which the contaminant quinoline has been added in concentrations of 10 wt. p.p.m. The procedure is continued until 2900 cc. of contaminated mixtures have passed over these sieves whereupon the breakthrough slope is evaluated. This value is 46 cc. Thus, the presence of 10 p.p.m. quinoline in the mixtures has caused the rate of exchange of $C_{14}$ for $C_{10}$ to decrease by 229% for the unwashed sieves.

Example VI

Another portion of the batch of sieves of Example V is washed in liquid water at 150° C. for a period of 4 hours and dried carefully to a water content of 1.8 wt. percent in nitrogen. These water washed sieves are evaluated in the dynamic test apparatus described in Example I and result in a breakthrough slope of 10.8 cc. These sieves are then exposed to the 10 p.p.m. quinoline contaminated mixtures in the same manner as described in Example V. This procedure is continued until 3200 cc. of contaminated mixtures have passed over the sieves. The breakthrough slope is then evaluated and proves to be 23.1 cc. Thus, the presence of 10 p.p.m. quinoline in the mixtures has caused the rate of exchange of $C_{14}$ for $C_{10}$ to decrease by 114% for the washed sieves. Comparison of these results with those of Example V show that washing the sieves have resulted in desensitizing the sieves to quinoline by a factor of about 2.

Example VII

Another batch of commercially available Type A molecular sieves are evaluated in the dynamic test apparatus in the same manner as described in Example I resulting in an initial breakthrough slope of 13.6 cc. A commercial feedstock in the kerosene boiling range used to obtain normal paraffins in the $C_{10}$ to $C_{16}$ range and containing measurable impurities comprising oxygenates, carbonyl, nitrogen, diphenyls and naphthalenes is passed over the sieves until 2900 cc. have passed through the bed. Thereupon the breakthrough slope is evaluated and is found to be 24.0 cc.

Example VIII

Another portion of the batch of sieves of Example I is washed in liquid water at 150° C. for a period of 4 hours and dried carefully to a water content of 1.8 wt. percent in nitrogen. These water washed sieves are evaluated in the dynamic test apparatus described in Example I and result in a breakthrough slope of 9.0 cc. These sieves are thereupon contacted with the feedstock described in Example VII until 3250 cc. have passed thereover. The breakthrough slope is evaluated and is found to be 13.8 cc. Again comparison of the results of Examples VII and VIII clearly show the improvement in the sorption characteristics of the water washed sieves.

We claim as our invention:

1. In the separation of a straight chain hydrocarbon from a hydrocarbon mixture containing the same by treatment of the mixture with and sorption of the straight chain hydrocarbon in bindered zeolite particles, the method of improving the sorption exchange rate of said particles and desensitizing the particles to surface poisons, which comprises treating the bindered zeolite particles, prior to their use in the aforesaid hydrocarbon separation, by the steps of
    (1) contacting said particles with liquid water at a temperature below about 175° C.; and
    (2) thereafter drying the thus treated particles to remove the water therefrom.

2. The method of claim 1 further characterized in that the binder in said zeolite particles is clay.

3. The method of claim 1 further characterized in that the zeolite particles comprise a crystalline aluminosilicate molecular sieve having uniform pore entrances less than about 6 angstrom units.

4. The method of claim 3 further characterized in that each zeolite particle is composed of small particles of Type A crystalline aluminosilicate held together in said zeolite particle by a binder.

References Cited

UNITED STATES PATENTS

| | | | |
|---|---|---|---|
| 2,987,471 | 6/1961 | Eggertsen | 208—310 |
| 3,224,167 | 12/1965 | Jones | 260—676 X |
| 3,306,848 | 2/1967 | Wackher et al. | 208—310 |

DANIEL E. WYMAN, *Primary Examiner.*

C. F. DEES, *Assistant Examiner.*